UNITED STATES PATENT OFFICE.

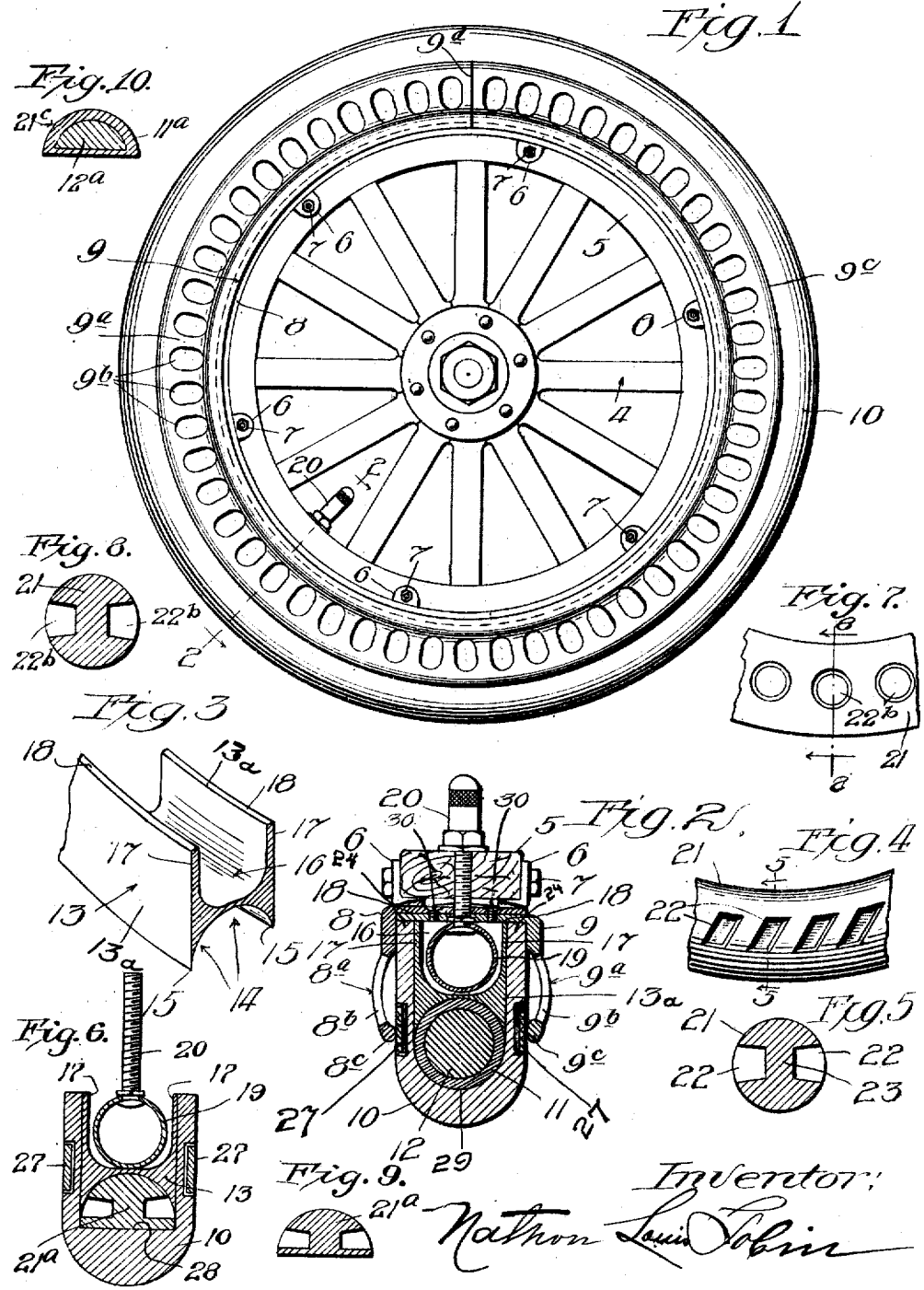

NATHAN LOUIS TOBIN, OF CHICAGO, ILLINOIS.

PNEUMATIC AUTOMOBILE-TIRE.

1,300,050.  Specification of Letters Patent.  Patented Apr. 8, 1919.

Application filed May 10, 1918. Serial No. 233,747.

*To all whom it may concern:*

Be it known that I, NATHAN L. TOBIN, a citizen of the present Government of Russia, residing at Chicago, in the county of Cook and State of Illinois, have invented a new and useful Pneumatic Automobile-Tire, of which the following is a specification.

My invention relates to improvements in pneumatic tires, in which air operates in conjunction with an elastic cushion to give resiliency to the tire, and the objects of my invention, are, first, to provide a puncture proof tire; second, to afford full power of elastic riding on the tire and cooling its interior, and third, to provide improved means for facilitating the application and removal of the rim to and from the tire.

I attain these objects by the means illustrated in the accompanying drawings, in which:—

Figure 1 is a side elevation of a wheel, showing a simple form of my improved tire secured thereon; Fig. 2 is a detail cross section thereof taken on the line 2—2 of Fig. 1; Fig. 3 is a perspective view of a fragment of a liner forming part of my invention; Fig. 4 is a side elevation of a fragment of a modified form of cushion used in the tire; Fig. 5 is a detail cross section taken on line 5—5 of Fig. 4; Fig. 6 is a detail cross section of another modified form of the tire, the rim and felly being omitted; Fig. 7 is a side elevation of another modified form of cushion; Fig. 8 is a detail cross section taken on the line 8—8 of Fig. 7; Fig. 9 is a detail cross section of the cushion seen in Fig. 6, and Fig. 10 is a detail cross section of another modified form of cushion.

Similar reference characters refer to similar parts throughout the views. In said drawings, a wheel is illustrated, of which the reference character 4, designates spokes which radiate out from a hub and have a felly 5, secured upon their outer ends. A rim, comprising two overlapping rim sections 8, 9, is secured to the felly by wedges 6, which are interposed between the felly and rim and secured to the felly by bolts and nuts 7. The tire casing 10, has within it an elastic cushion, which may comprise an annular tube 11, that is filled with an elastic packing 12. The tire casing is substantially U-shaped in cross section and the annular tube 11 bears against the inner face 29 at the tread portion of the tire casing. Bearing against the elastic cushion is a liner 13ª which has flat or straight sided walls 13, and is formed with an annular arch 14, between two legs 15, of the walls 13. On the side opposite the arch of the liner is an annular pocket, chamber or groove 16, (see Figs. 2 and 3), which is formed between two flat portions 17, of the side walls 13; the wall portions 17, terminate at the edges 18, which rest against the rim section 9. In the pocket, chamber or groove 16, is contained an air tube 19, which is pumped up through a valve 20, after the rim sections have been placed on the tire casing 10, and secured to each other by set screws 21.

The side walls of the tire casing 10, are constructed in straight parallel lines, their edges 24 engaging with the rim section 9. In use both rim sections 8, 9, are adjusted to fit tightly over the open mouth of the tire casing, (see Fig. 2). The rim sections are provided with side flanges which have outwardly bowed portions 8ª, 9ª, in which are formed perforations 8ᵇ, 9ᵇ. The inner or bearing edges of the rim flanges are rounded off as seen at 8ᶜ, 9ᶜ, to provide smooth bearing edges that bear against the sides of the tire casing. At the place where said edges 8ᶜ, 9ᶜ, bear against the tire casing, it is provided with rings 27, formed of asbestos or other protective material, to thereby prevent injury to the tire casing, due to friction between the rim flanges 8ª, 9ª, and the tire casing.

As shown in Fig. 2, the elastic cushion consists of the tube 11, and the elastic packing 12, and the outer wall of the tube 11 may be composed of rubber or coarse fabric and its inside walls may be lined with rubber. The packing 12 may consist of any kind of imitation rubber or any suitable elastic material which may be introduced into the tube while in a liquid state and permitted to harden after it has been put into the tube. This will afford the proper resiliency for the tire, in conjunction with the air tube.

The liner 13ª, (see Fig. 3), may consist of fine fabric and the wall of its arch portion 14 between the two legs 15 bears tightly against the elastic cushion. The walls 13 of the liner are pressed tightly against the inner straight faces of the casing by the air tube 19, when the same is inflated. The pocket, chamber or groove 16, of the liner 13ª, is a safe guard pocket for the inner air tube 19, which rests comfortably in said pocket and bears against the walls thereof and adjacent face of the rim section 9. The inner air tube 19 is, as usual, made of fine rubber and its size, in cross section is reduced 30% to 40%, to those now on the market for the different sizes of tires.

When the air tube is pumped up after the rims, 8, 9, have been placed on the tire casing and screwed together by the screws 21, the air tube will fill up the entire pocket 16, of the liner 13ª, and will press tightly against the inner faces of said liner and rim section 9, thereby forcing the outer faces of the walls 17 against the inner side faces of the tire casing and, at the same time, press out the arch portion of the liner against the elastic cushion. The result of this is a tight unity of the entire construction inside of the tire casing 10.

The rim sections 8, 9, are preferably made of hard steel and are demountable. Each rim is split at 9ᵈ, (see Fig. 1), to facilitate the placing of the rim sections on the tire casing and to give a tight fit. The tire casing is locked in the rims as follows: The rim 9 is placed across the edges 24 of the tire casing and edges 18 of the liner; the rim 8 is then placed from the opposite side of the tire, across the rim 9, so that the inner face of the rim 8, bears against the outer face of the rim 9, with a fairly tight fit. In this position they are screwed together by set screws 21.

The flange portions 8ª, 9ª, of the rim sections are constructed in an arch or outwardly bowed shape to permit the tire to bulge into the annular recesses, (formed by the bowed flanges 8ª, 9ª), when the tire travels over rough roads. The rounded edges 8ᶜ, 9ᶜ, engage the tire casing in parallel lines and form lateral supports for the tire, tending to resist any lateral movement of the tire caused by side sway of the car. The openings 8ᵇ, 9ᵇ, are for the purpose of preventing particles of dirt, sand or stone from accumulating in the annular space between the tire casing and rim flanges; any particles that enter between the tire casing and edges 8ᶜ, 9ᶜ, will fall out through the openings 8ᵇ, 9ᵇ.

The rim sections are locked to the felly 5 by the wedges 6, which are inserted on both sides of the felly between the rim sections 8, 9 and the felly. Said wedges may be thin along their inner edges and may be driven in between the felly and rim sections to make the rim secure thereon. The bolts and nuts 7 prevent accidental displacement of the wedges.

The height of the entire construction, shown in Fig. 2, is subject to be reduced as may be desired, in the production designed for heavy trucks, by reducing the annular elastic cushion into semi-circular form, (in cross section), as seen at 21ª 21ᶜ in Figs. 6, 9 and 10. In this case the inner face 28, (see Fig. 6), of the tire casing assumes a flat annular form. The tire casing may thereby be reduced in height in proportion to the part which has been removed from the cushion. Any desirable width of tire may be constructed by proportionally increasing the width of the several parts.

The elastic cushion may be replaced by a round solid pad 21, composed of rubber and fabric as illustrated in Figs. 4 and 5. Openings or recesses 22, may be contained in the sides of said pad 21, and said openings may be of any suitable configuration and in Fig. 4 they are illustrated in the form of parallelograms, while in Fig. 7 they are illustrated in the form of circles at 22ᵇ. Preferably said openings or recesses are so arranged that there is one row on each side of the pad, (see Figs. 5 and 8), each row being disposed opposite to the other. Preferably each opening or recess extends one-third way into the pad so that the remaining one-third part 23 that intervenes between the two openings is solid. This elastic pad furnishes elasticity to the tire and, at the same time, also provides for cooling the interior thereof.

In the cushion illustrated in Fig. 10, the tube 11ª, is in the form of a semi-circle in cross section, in which tube is contained the elastic packing 12ª. Obviously, when this form of elastic cushion is used, a tire casing having the flat inner bearing face 28, (see Fig. 6), is used.

I am aware that prior to my invention, automobile tires have been made of solid cushions to operate in conjunction with air. therefore, I do not claim such a combination broadly, but

I claim:

1. In a pneumatic tire, a tire casing for containing solid and pneumatic cushioning members, said casing being U-shaped in cross section, the depth of the interior of the casing at any place, being approximately twice as great as its width, the inner and outer faces of the sides of which are flat and parallel.

2. The combination with a tire casing, substantially U-shaped in cross section, of a resilient cushion bearing against the inner face of said casing at the tread portion thereof, a liner having an arched outer side bearing against said cushion and an arched inner side, an air tube in said arched inner side and removable from said liner, and a rim against which said tube, liner and casing bear, said rim having annular side flanges embracing the sides of the tire casing, said air tube when inflated acting to press the edge portions of the sides of the casing against the rim.

3. The combination with a tire casing, substantially U-shaped in cross section, of a resilient cushion having recesses in its sides, said cushion bearing against the inner face of said casing at the tread portion thereof, a liner having an arched inner side, an air tube in said arched inner side, and removable from said liner, and a rim against which said tube, liner and casing bear, said rim having annular side flanges embracing the sides of the tire casing.

4. In a pneumatic tire, a tire casing, two companion demountable rim sections, each having an annular side flange adapted to extend along a side of said casing, said flanges being outwardly bowed in cross section and being formed with openings for the escape of foreign matter; the inner edges of said flanges being rounded off and bearing against the sides of the tire casing on directly opposite sides thereof, and means independent of the wheel for locking the rim sections together with the tire casing therebetween.

5. The combination of a tire casing, substantially U-shaped in cross section, of an elastic cushion bearing against the inner face of the casing at the tread portion thereof, a liner bearing against said cushion and being arched in cross section on its outer side to conform to the face of said cushion, said liner having two flat parallel side walls projecting away from the arched side, and extending to the edges of the casing, a rim extending across the open side of the casing and liner and bearing against the same, and having annular side flanges embracing the sides of the casing, and an air tube confined in the chamber formed between the liner and rim.

6. In a pneumatic tire, a rim having annular side flanges outwardly bowed in cross section, and a tire casing secured on said rim between said flanges and having asbestos anti-friction rings secured on its sides, which rings contact with the edge portions of the rim flanges.

7. In a pneumatic tire, a tire casing substantially U-shaped in cross section and having flat parallel side walls, an elastic cushion bearing against the inner face thereof, at the tread portion, a liner having flat parallel side walls bearing against the flat inner faces of the side walls of the casing, said liner having an arched outer side conforming from and bearing against said cushion and having an annular chamber on its inner side, an air tube in said chamber and a demountable rim upon which said casing is secured.

8. In a pneumatic tire, a tire casing substantially U-shaped in cross section and having flat parallel side walls, an elastic cushion bearing against the inner face thereof at the tread portion, a liner having flat parallel side walls bearing against the flat inner faces of the side walls of the casing, said liner having an arched outer side conforming to and bearing against said cushion and having an annular chamber on its inner side, an air tube in said chamber, and a rim comprising two companion overlapping rim sections, each formed with an annular side flange, outwardly bowed in cross section, the edge portions of said flanges bearing against the sides of the casing to form lateral supports therefor, means for securing said rim sections together upon said casing and separate means for demountably securing said rim upon the felly of a wheel.

NATHAN LOUIS TOBIN.

Copies of this patent may be obtained for five cents each, by addressing the "Commissioner of Patents, Washington, D. C."